US011923594B2

(12) United States Patent
Liu et al.

(10) Patent No.: US 11,923,594 B2
(45) Date of Patent: Mar. 5, 2024

(54) ANTENNA MOUNTING DEVICE

(71) Applicant: CommScope Technologies LLC, Hickory, NC (US)

(72) Inventors: Maosheng Liu, Jiangsu (CN); Zhaohui Liu, Jiangsu (CN); Puliang Tang, Jiangsu (CN); Ruixin Su, Jiangsu (CN); Junfeng Yu, Jiangsu (CN)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 359 days.

(21) Appl. No.: 17/422,864

(22) PCT Filed: Jan. 9, 2020

(86) PCT No.: PCT/US2020/012822
§ 371 (c)(1),
(2) Date: Jul. 14, 2021

(87) PCT Pub. No.: WO2020/150062
PCT Pub. Date: Jul. 23, 2020

(65) Prior Publication Data

US 2022/0102830 A1 Mar. 31, 2022

(30) Foreign Application Priority Data

Jan. 18, 2019 (CN) ......................... 201910047880.0

(51) Int. Cl.
*H01Q 1/12* (2006.01)
*H01Q 1/24* (2006.01)

(52) U.S. Cl.
CPC ......... *H01Q 1/1207* (2013.01); *H01Q 1/1242* (2013.01); *H01Q 1/246* (2013.01)

(58) Field of Classification Search
CPC .... H01Q 1/1207; H01Q 1/1242; H01Q 1/246; H01Q 1/1228
See application file for complete search history.

(56) References Cited

U.S. PATENT DOCUMENTS 6,856,302 B2 * 2/2005 Gonçalves ........... H01Q 1/1207 343/890
9,882,260 B2 * 1/2018 Mummert ............ H01Q 1/1242
(Continued)

FOREIGN PATENT DOCUMENTS

KR 20120086307 A 8/2012

OTHER PUBLICATIONS

"International Preliminary Report on Patentability corresponding to International Application No. PCT/US2020/012822 dated Jul. 29, 2021".
(Continued)

*Primary Examiner* — Seung H Lee
(74) *Attorney, Agent, or Firm* — Myers Bigel, P.A.

(57) ABSTRACT

The present disclosure has disclosed an antenna mounting device configured to collectively mount a plurality of base station antennas on a mast of a communication tower. The antenna mounting device is substantially in the shape of a polygon, and the mast is disposed at a center of the polygon. The antenna mounting device comprises: a plurality of brackets, which are elongated and include a head bracket, at least one intermediate bracket and a tail bracket attached sequentially; and a bracket fastening mechanism which is disposed between two adjacent ends of the head bracket and an adjacent intermediate bracket, or disposed between two adjacent ends of the adjacent intermediate brackets, or disposed between two adjacent ends of the tail bracket and the adjacent intermediate bracket, and which is configured to move two adjacent ends of the adjacent brackets from a position away from each other to a position close to each other. The antenna mounting device according to the present invention is capable of mounting a plurality of base station antennas on a mast by surrounding the mast in a compact
(Continued)

manner, thereby realizing a small-form factor mounting structure.

21 Claims, 10 Drawing Sheets

(56) References Cited

U.S. PATENT DOCUMENTS

| | | | | |
|---|---|---|---|---|
| 2002/0162924 | A1 | 11/2002 | Herzog | |
| 2006/0192717 | A1 | 8/2006 | Kim | |
| 2016/0365624 | A1 * | 12/2016 | Maley | H01Q 21/205 |
| 2018/0277923 | A1 | 9/2018 | Kang et al. | |

OTHER PUBLICATIONS

"International Search Report and Written Opinion corresponding to International Application No. PCT/US2020/012822 dated May 7, 2020".

* cited by examiner

ANTENNA MOUNTING DEVICE

RELATED APPLICATION

The present application is a 35 U.S.C. § 371 national phase application of PCT Application PCT/US2020/012822, filed Jan. 9, 2020, which claims priority from and the benefit of Chinese Patent Application No. 201910047880.0, filed Jan. 18, 2019, the disclosure of which is hereby incorporated herein by reference in full.

TECHNICAL FIELD

The present disclosure generally relates to the field of base station antennas. More specifically, the present disclosure relates to an antenna mounting device for collectively mounting a plurality of base station antennas on a mast of a communication tower.

BACKGROUND ART

In a mobile communication network, it is necessary to reasonably configure a base station antenna according to actual conditions such as network coverage requirements, telephone traffic distribution, and anti-interference requirements. In some scenarios, there is a need to mount three or more base station antennas around the same mast of the communication tower. In the case where the mounting positions of the base station antenna are located at both ends of the top and bottom thereof, an operator can access the mounting position of the base station antenna from above or below the base station antenna using a mounting tool, and mount the base station antenna on the mast so that the antennas surround the mast However, as shown in FIGS. 1A-1C, in the case where the mounting position MP of the base station antenna BA is located at the back of the antenna body, away from the top and bottom of the antennas, the mounting tool needs to access the mounting position through a gap GP between the adjacent base station antennas BA, so as to mount the base station antenna BA on the mast MT. Therefore, in order to ensure the accessibility of the mounting tool and the ease of installation, a sufficient circumferential distance has to be left between the base station antennas BA, which results in a large outer profile of the antenna assembly after installation.

SUMMARY

One object of the present disclosure is to provide an antenna mounting device capable of overcoming at least one of the defects in the prior art.

The subject art of the present disclosure has been illustrated according to various aspects described below. For convenience, various embodiments in various aspects of the subject art are described as labeled clauses (1, 2, 3, etc.). These clauses are provided as embodiments, rather than limiting the subject art of the present disclosure.

1. An antenna mounting device configured to collectively mount a plurality of base station antennas on a mast of a communication tower, wherein the antenna mounting device is substantially in the shape of a polygon, and the mast is disposed at a center of the polygon, the antenna mounting device comprising:
   a plurality of brackets, which are elongated and include a head bracket, at least one intermediate bracket and a tail bracket attached sequentially, wherein adjacent ends of the plurality of brackets are pivotally connected together in a head-to-tail manner, each bracket including an antenna connection portion and a mast connection portion connected to each other, wherein the antenna connection portion faces away from the mast and is configured to connect the base station antenna to the bracket, and the mast connection portion faces the mast and is configured to connect the bracket to the mast; and
   a bracket fastening mechanism which is disposed between two adjacent ends of the head bracket and an adjacent intermediate bracket, or disposed between two adjacent ends of the adjacent intermediate brackets, or disposed between two adjacent ends of the tail bracket and the adjacent intermediate bracket, and which is configured to move two adjacent ends of the adjacent brackets from a position away from each other to a position close to each other.
2. The antenna mounting device according to clause 1, wherein the bracket fastening mechanism includes a first fastening plate and a second fastening plate in parallel relationship, and a fastening rod threadedly connected to the first fastening plate and the second fastening plate.
3. The antenna mounting device according to clause 2, wherein the two adjacent ends of said adjacent brackets are provided with a pair of slots in mirror symmetry, wherein the first fastening plate and the second fastening plate are movable towards each other or movable away from each other along the pair of slots upon rotation of the fastening rod.
4. The antenna mounting device according to clause 3, wherein each of the slots is V-shaped, and includes a first sub-slot and a second sub-slot symmetrical and inclined to each other.
5. The antenna mounting device according to clause 4, wherein the first fastening plate and the second fastening plate each include a plate body and a pair of sliding members disposed on the plate body.
6. The antenna mounting device according to clause 5, wherein the pair of sliding members of the first fastening plate are confined within the first sub-slots of the pair of slots, and are slidable along the first sub-slots; the pair of sliding members of the second fastening plate are confined within the second sub-slots of the pair of slots and are slidable along the second sub-slots.
7. The antenna mounting device according to clause 4, wherein V-shaped openings face each other or face away from each other.
8. The antenna mounting device according to clause 4, wherein each of the sub-slots has a rectilinear shape, an inwardly concave arc shape, or an outwardly convex arc shape.
9. The antenna mounting device according to clause 3, wherein the pair of slots each have a straight linear shape, and are inclined to each other.
10. The antenna mounting device according to clause 9, wherein the first fastening plate includes a plate body, and a pair of sliding members projecting outward from the plate body, and the second fastening plate is fixedly connected to one of said adjacent brackets.
11. The antenna mounting device according to clause 10, wherein the pair of sliding members of the first fastening plate are confined within the pair of slots and are slidable along the pair of slots.

12. The antenna mounting device according to clause 9, wherein each of the slots has a rectilinear shape, an inwardly concave arc shape, or an outwardly convex arc shape.
13. The antenna mounting device according to any one of clauses 5-6 and 10-11, wherein the sliding member is configured as protruding portions projecting outward from the plate body and having a head with an increased size.
14. The antenna mounting device according to clause 13, wherein the protruding portion is a bolt or a split pin mounted with a gasket at a top end.
15. The antenna mounting device according to clause 1, wherein the antenna connection portion is configured as a side wall, and the mast connection portion is configured as at least one protruding wall that projects outward from the side wall in the same direction and is parallel to each other.
16. The antenna mounting device according to clause 15, wherein the at least one protruding wall includes two protruding walls.
17. The antenna mounting device according to clause 15, wherein the side wall is connected to the base station antenna in a mechanical connection manner.
18. The antenna mounting device according to clause 15, wherein the side wall is connected to the base station antenna by screws or bolts.
19. The antenna mounting device according to clause 15, wherein the protruding wall includes a mast fitting portion which has an outer contour matching that of the mast so as to assemble the bracket to the mast.
20. The antenna mounting device according to clause 19, wherein serrations are provided on an outer edge of the mast fitting portion.
21. The antenna mounting device according to clause 1, wherein in addition to two adjacent ends provided with the bracket fastening mechanism, two adjacent ends of the head bracket and the adjacent intermediate bracket, two adjacent ends of the adjacent intermediate brackets, and two adjacent ends of the tail bracket and the adjacent intermediate bracket are pivotally connected together by a pin.
22. The antenna mounting device according to clause 1, wherein one of two adjacent ends between the head bracket and the tail bracket is provided with a hook portion, and the other is provided with a rod portion for hooking the hook portion.
23. The antenna mounting device according to clause 1, wherein the two adjacent ends between the head bracket and the tail bracket are pivotally connected together by a pin.
24. An antenna mounting device configured to collectively mount a plurality of base station antennas on a mast of a communication tower, comprising:
    first, second and third elongated brackets, wherein adjacent ends of the plurality of brackets are pivotally connected together in a head-to-tail manner, each of the first, second and third brackets including an antenna connection portion and a mast connection portion connected to each other, wherein the antenna connection portion faces away from the mast and is configured to connect the base station antenna to the bracket, and the mast connection portion faces the mast and is configured to connect the bracket to the mast; and
    a bracket fastening mechanism which is disposed between two adjacent ends of two of the first, second and third brackets, the bracket fastening mechanism configured to move the two adjacent ends between spaced apart and closely adjacent positions, wherein in the spaced apart position, the brackets are free to slide relative to the mast, and in the closely adjacent position, the brackets clamp onto the mast to prevent relative sliding of the brackets and mast.
25. The antenna mounting device defined in Clause 24, wherein a first antenna is mounted to the first bracket.
26. The antenna mounting device defined in Clause 25, wherein the first bracket is attached to the first antenna at a location spaced from an end of the first antenna.

Other features and advantages of the subject art of the present disclosure will be formulated in the following descriptions, and will be partially obvious from said descriptions, or may be learned by practicing the subject art of the present disclosure. Advantages of the subject art of the present disclosure will be realized and attained by the structure particularly set forth in the written description as well as its claims and drawings.

It should be understood that, the aforementioned general descriptions and the following detailed descriptions are all embodimental and descriptive, and intended to provide further illustrations of the subject art of the present disclosure for which protection is sought.

BRIEF DESCRIPTION OF THE DRAWINGS

After reading the embodiments hereinafter in combination with the drawings, a plurality of aspects of the present disclosure will be better understood. In the drawings.

EMBODIMENTS

Figure 1A:
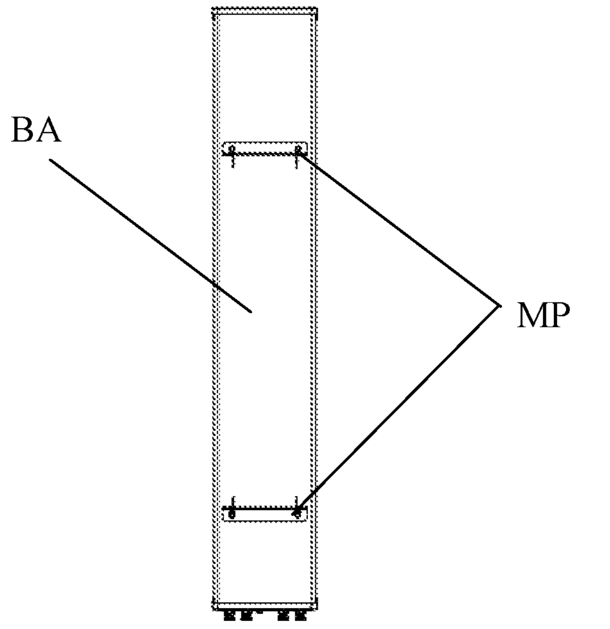
FIG. 1A is a schematic view of a mounting position of a base station antenna.
Figure 1B:
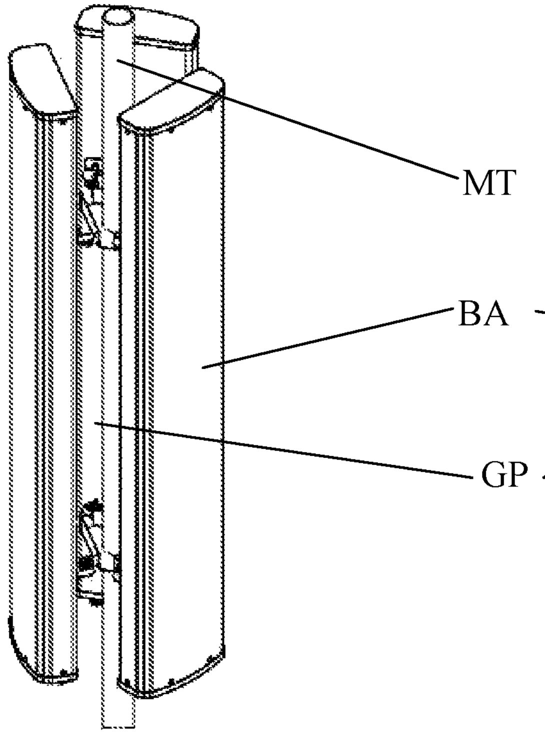
FIGS. 1B and 1C are a perspective view and a top view of an antenna mounting device in the prior art showing how an antenna as in FIG. 1A is mounted.
Figure 1C:
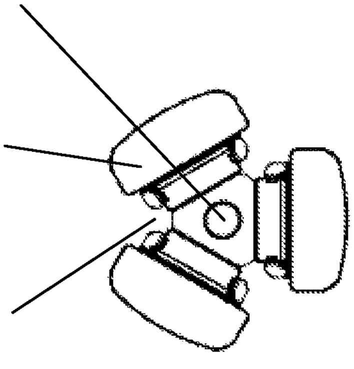

The present disclosure will be described below with reference to the drawings, in which several embodiments of the present disclosure are shown. It should be understood, however, that the present disclosure may be presented in multiple different ways, and not limited to the embodiments described below. In fact, the embodiments described hereinafter are intended to make a more complete disclosure of the present disclosure and to adequately explain the protection scope of the present disclosure to a person skilled in the art. It should also be understood that, the embodiments disclosed herein can be combined in various ways to provide more additional embodiments.

It should be understood that, in all the drawings, the same reference signs present the same elements. In the drawings, for the sake of clarity, the sizes of certain features may be deformed.

It should be understood that, the wording in the specification is only used for describing particular embodiments and is not intended to define the present disclosure. All the terms used in the specification (including the technical terms and scientific terms), have the meanings as normally understood by a person skilled in the art, unless otherwise defined. For the sake of conciseness and/or clarity, the well-known functions or constructions may not be described in detail any longer.

The singular forms “a/an”, “said” and “the” as used in the specification, unless clearly indicated, all contain the plural forms. The wordings “comprising”, “containing” and “including” used in the specification indicate the presence of the claimed features, but do not repel the presence of one or more other features. The wording “and/or” as used in the specification includes any and all combinations of one or more of the relevant items listed. The phases “between X and Y” and “between about X and Y” as used in the specification should be construed as including X and Y. The phrase “between about X and Y” as used in the present specification means “between about X and about Y”, and the phrase “from about X to Y” as used in the present specification means “from about X to about Y”.

In the specification, when one element is referred to as being “on” another element, “attached to” another element, “connected to” another element, “coupled to” another element, or “in contact with” another element, the element may be directly located on another element, attached to another element, connected to another element, coupled to another element, or in contact with another element, or there may be present with an intermediate element. By contrast, where one element is referred to as being “directly” on another element, “directly attached to” another element, “directly connected to” another element, “directly coupled to” another element, or “in direct contact with” another element, there will not be present with an intermediate element. In the specification, where one feature is arranged to be “adjacent” to another feature, it may mean that one feature has a portion that overlaps with an adjacent feature or a portion that is located above or below an adjacent feature.

In the specification, the spatial relation wordings such as “up”, “down”, “left”, “right”, “forth”, “back”, “high”, “low” and the like may describe a relation of one feature with another feature in the drawings. It should be understood that, the spatial relation wordings also contain different orientations of the apparatus in use or operation, in addition to containing the orientations shown in the drawings. For example, when the apparatus in the drawings is overturned, the features previously described as “below” other features may be described to be “above” other features at this time. The apparatus may also be otherwise oriented (rotated 90 degrees or at other orientations). At this time, the relative spatial relations will be explained correspondingly.

Figure 2A:
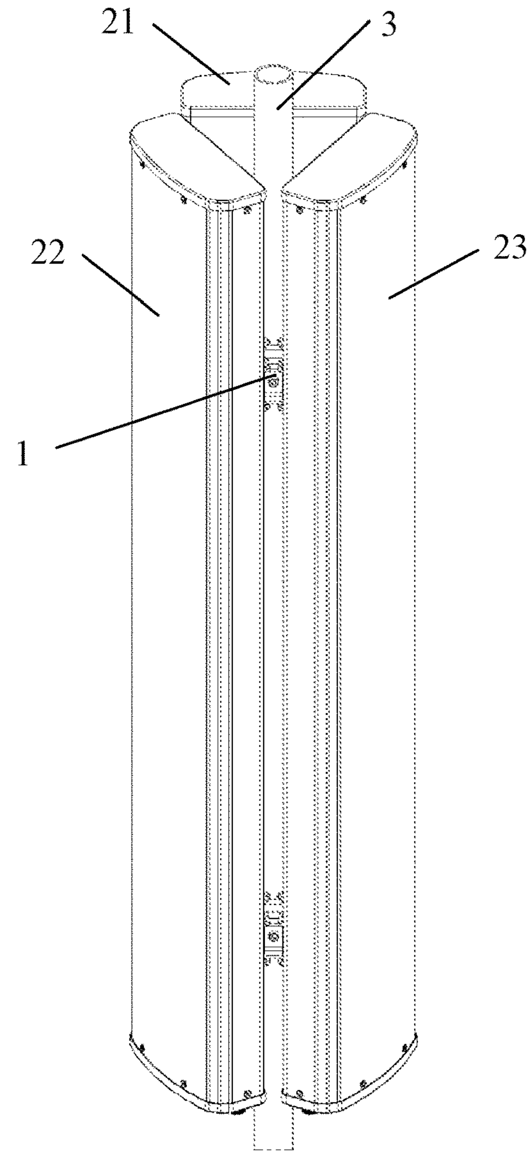
FIGS. 2A and 2B are a perspective view and a top view of a base station antenna mounted with an antenna mounting device according to an embodiment of the present invention.
Figure 2B:
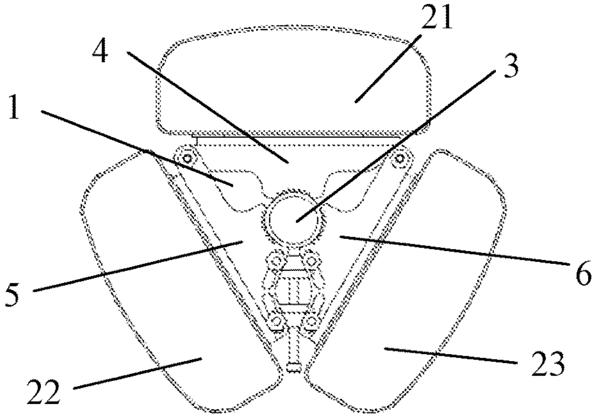

FIGS. 2A and 2B show an antenna mounting device 1 according to an embodiment of the present invention, which collectively mounts a plurality of base station antennas on a mast 3 in an arrangement that surrounds the mast 3 of a communication tower. The antenna mounting device 1 has a substantially equilateral triangular configuration, and the mast 3 is disposed at the center of the triangle. The antenna mounting device 1 comprises a head bracket 4, an intermediate bracket 5, and a tail bracket 6 which are sequentially disposed on three sides of the triangle. The head bracket 4, the intermediate bracket 5 and the tail bracket 6 are elongated, and connected together by ends in a head-to-tail manner. The head bracket 4, the intermediate bracket 5 and the tail bracket 6 are used to connect the three base station antennas 21, 22, 23 to the mast 3, respectively.

Figure 3A:
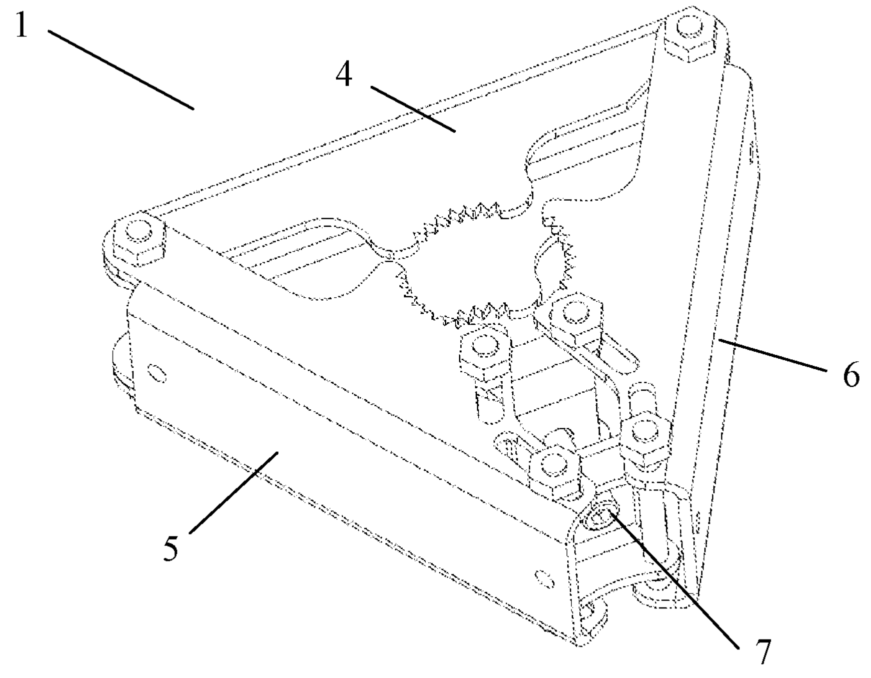
FIGS. 3A and 3B are an assembled perspective view and an exploded perspective view of an antenna mounting device according to an embodiment of the present invention.
Figure 3B:
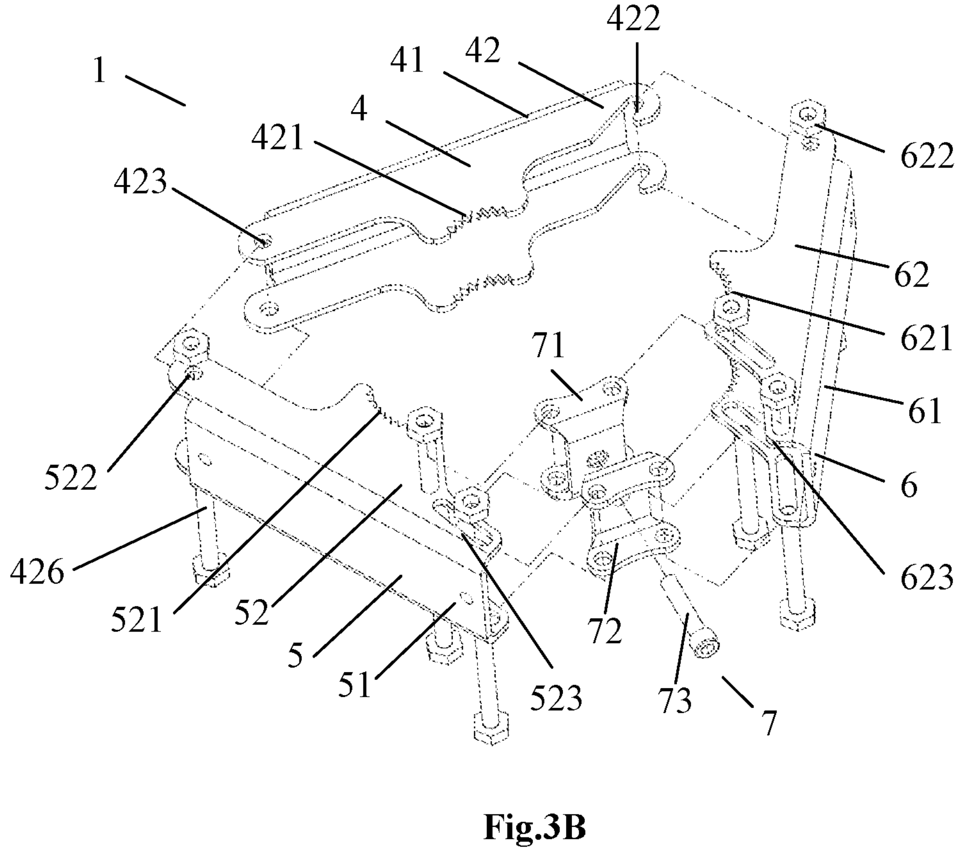
Figure 4:
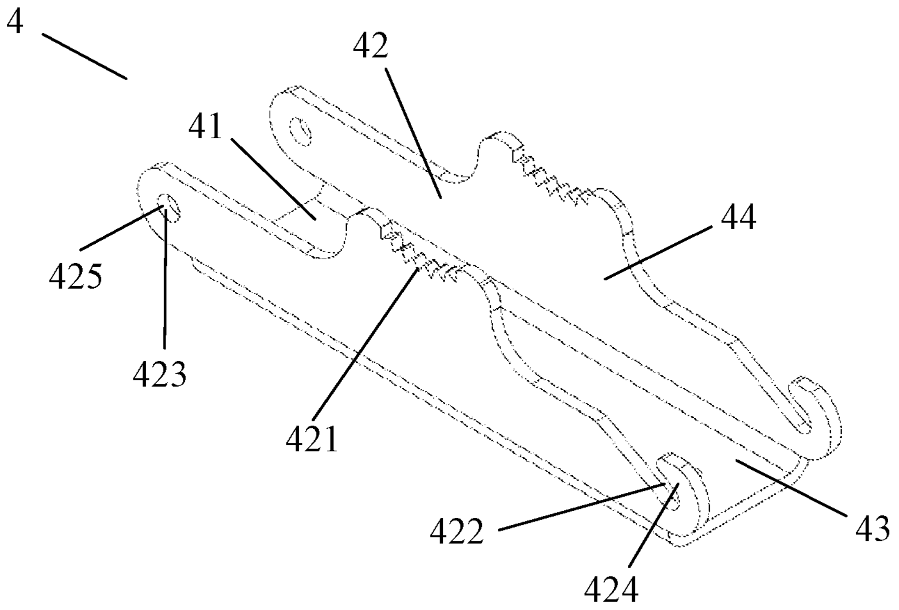
FIG. 4 is a perspective view of a head bracket of an antenna mounting device according to an embodiment of the present invention.

FIGS. 3A and 3B respectively show an assembled perspective view and an exploded perspective view of the antenna mounting device 1. Referring to FIGS. 3A, 3B and 4, the head bracket 4 includes an antenna connection portion 41 and a mast connection portion 42 which are connected to each other. The antenna connection portion 41 faces away from the mast 3, and is used to connect the antenna 21 to the head bracket 4. The mast connection portion 42 faces the mast 3, and is used to connect the head bracket 4 to the mast 3. In one embodiment, the antenna connection portion 41 is configured as a vertical side wall 43, and the mast connection portion 42 is configured as at least one protruding wall 44 that projects outward from the side wall 43 in the same direction and is parallel to each other. In one embodiment, the at least one protruding wall 44 consists of two protruding walls.

The side wall 43 of the antenna connection portion 41 is provided with a screw hole for connecting to the back of the base station antenna 21 by screws. In other embodiments, the side wall 43 may also be connected to the back of the base station antenna 21 in other ways connection manners such as welding, riveting, clamping, or the like.

The mast connection portion 42 includes a mast fitting portion 421 at the middle and bracket connection portions 422 and 423 located at both ends. The mast fitting portion 421 has an outer contour generally matching that of the mast 3 so as to assemble the head bracket 4 to the mast 3. In one embodiment, the mast 3 has a circular cross-section, and the mast fitting portion 421 correspondingly has a circular arc shape so that the mast fitting portion 421 can be closely fitted to the outer surface of the mast 3. In some embodiments, serrations or teeth are provided on the outer edge of the mast fitting portion 421 so as to more securely fit the head bracket 4 to the mast 3.

The bracket connection portions 422 and 423 are pivotally connected to the tail bracket 6 and the intermediate bracket 5 in a pivotable manner. In one embodiment, the bracket connection portion 422 is configured as a hook 424 on the protruding wall 44, so as to be hooked onto the tail bracket 6. The bracket connection portion 423 is configured as a pin hole 425 on the protruding wall 44, so as to be connected to the intermediate bracket 5 by a pin 426.

Figure 5:
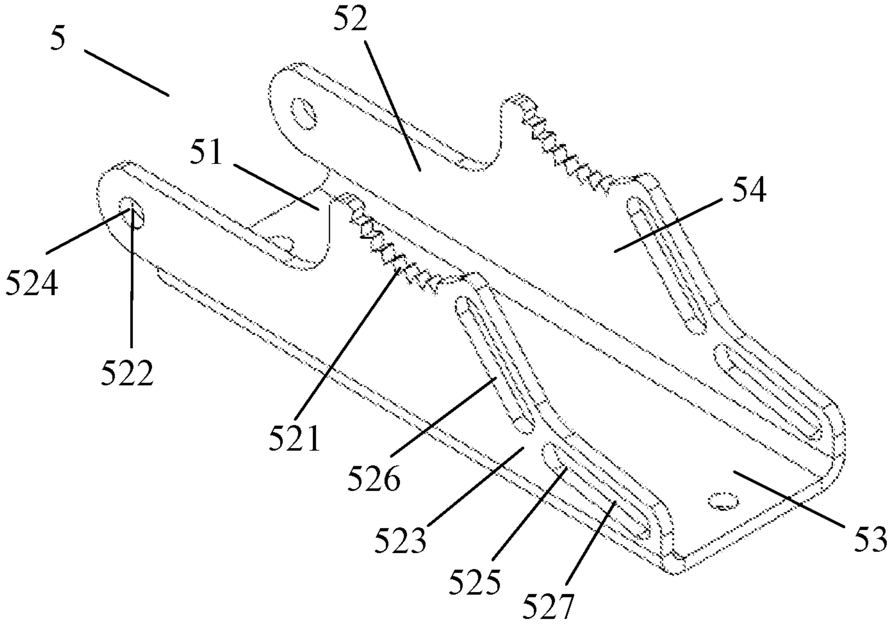
FIG. 5 is a perspective view of an intermediate bracket of an antenna mounting device according to an embodiment of the present invention.

Referring to FIGS. 3A, 3B and 5, the intermediate bracket 5 includes an antenna connection portion 51 and a mast connection portion 52 that are connected to each other. The antenna connection portion 51 faces away from the mast 3, and is used to connect the antenna 22 to the intermediate bracket 5. The mast connection portion 52 faces the mast 3, and is used to connect the intermediate bracket 5 to the mast 3. In one embodiment, the antenna connection portion 51 is configured as a vertical side wall 53, and the mast connection portion 52 is configured as at least one protruding wall

54 that projects outward from the side wall 53 in the same direction and is parallel to each other. In one embodiment, the at least one protruding wall 54 consists of two protruding walls.

The side wall 53 of the antenna connection portion 51 is provided with a screw hole for connecting to the back of the base station antenna 22 by screws. In other embodiments, the side wall 53 may also be connected to the back of the base station antenna 22 in other ways such as welding, riveting, clamping, or the like.

The mast connection portion 52 includes a mast fitting portion 521 at the middle, a bracket connection portion 522 located at one end, and a bracket fastening portion 523 located at the other end. The mast fitting portion 521 has an outer contour generally matching that of the mast 3 so as to assemble the intermediate bracket 5 to the mast 3. In one embodiment, the mast 3 has a circular cross-section, and the mast fitting portion 521 correspondingly has a circular arc shape so that the mast fitting portion 521 can be closely fitted to the outer surface of the mast 3. In some embodiments, serrations or teeth are provided on the outer edge of the mast fitting portion 521 so as to more securely fit the intermediate bracket 5 to the mast 3.

The bracket connection portion 522 is configured as a pin hole 524 on the protruding wall 54. The pin 426 may pass through the pin hole 524 and the pin hole 425 of the head bracket 4, so as to connect the head bracket 4 and the intermediate bracket 5 together.

The bracket fastening portion 523 is configured as a slot 525 on the protruding wall 54 to move the intermediate bracket 5 and the tail bracket 6 relative to each other via a bracket fastening mechanism 7 (described later in detail), so as to securely hold the mast 3 at the center.

Figure 6:
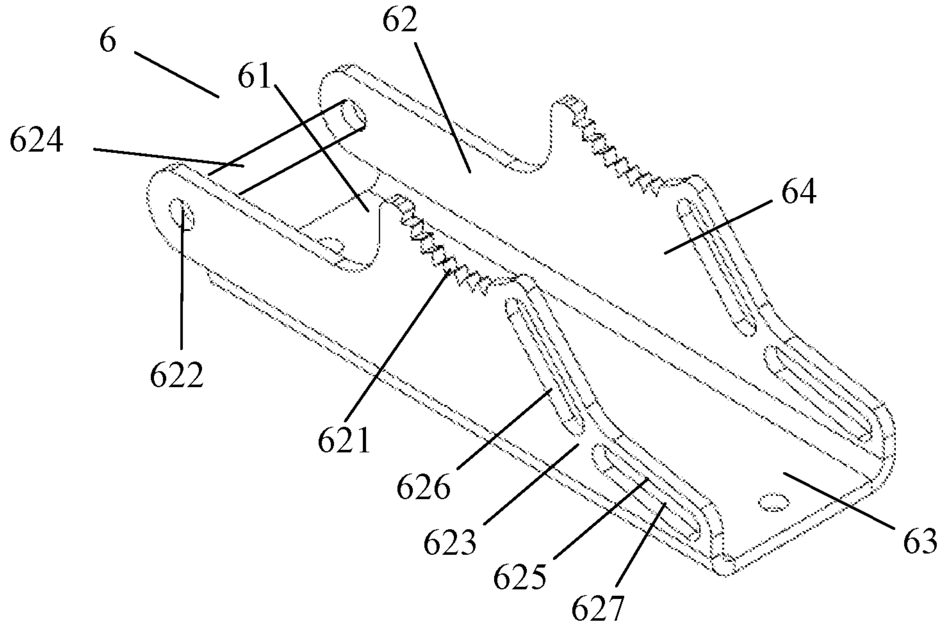
FIG. 6 is a perspective view of a tail bracket of an antenna mounting device according to an embodiment of the present invention.

Referring to FIGS. 3A, 3B and 6, the tail bracket 6 includes an antenna connection portion 61 and a mast connection portion 62 which are connected to each other. The antenna connection portion 61 faces away from the mast 3, and is used to connect the antenna 23 to the tail bracket 6. The mast connection portion 62 faces the mast 3, and is used to connect the tail bracket 6 to the mast 3. In one embodiment, the antenna connection portion 61 is configured as a vertical side wall 63, and the mast connection portion 62 is configured as at least one protruding wall 64 that projects outward from the side wall 63 in the same direction and is parallel to each other. In one embodiment, the at least one protruding wall 64 consists of two protruding walls.

The side wall 63 of the antenna connection portion 61 is provided with a screw hole for connecting to the back of the base station antenna 21 by screws. In other embodiments, the side wall 63 may also be connected to the base station antenna 23 in other ways such as welding, riveting, clamping, or the like.

The mast connection portion 62 includes a mast fitting portion 621 at the middle, a bracket connection portion 622 located at one end, and a bracket fastening portion 623 located at the other end. The mast fitting portion 621 has an outer contour generally matching that of the mast 3 so as to assemble the tail bracket 6 to the mast 3. In one embodiment, the mast 3 has a circular cross-section, and the mast fitting portion 621 correspondingly has a circular arc shape so that the mast fitting portion 621 can be closely fitted to the outer surface of the mast 3. In some embodiments, serrations or teeth are provided on the outer edge of the mast fitting portion 621 so as to more securely fit the tail bracket 6 to the mast 3.

The bracket connection portion 622 is configured as a rod portion 624 extending between the protruding walls 64, for hooking the hook portion 424 of the head bracket 4, so as to connect the head bracket 4 and the tail bracket 6 together. In some embodiments, the bracket connection portion 422 of the head bracket 4 is configured as a pin hole on the protruding wall 44, and the bracket connection portion 622 of the tail bracket 6 is configured as a pin hole on the protruding wall 64, such that the head bracket 4 and the tail bracket 6 are connected together by a pin passing through the two pin holes.

The bracket fastening portion 623 is configured as a slot 625 on the protruding wall 64. The slot 625 is in mirror symmetry with the slot 525 of the intermediate bracket 5, to move adjacent ends of the intermediate bracket 5 and the tail bracket 6 from a position away from each other to a position close to each other by a bracket fastening mechanism 7 (described later in detail), so as to securely hold the mast 3 at the center.

Referring to FIGS. 3A, 3B, and 7, the bracket fastening mechanism 7 includes two parallel fastening plates 71 and 72, and a bolt 73 that is threadedly connected to the two fastening plates 71 and 72 in a perpendicular manner. By screwing the bolt 73, the two fastening plates 71 and 72 can slide within the slot 525 of the intermediate bracket 5 and the slot 625 of the tail bracket 6, thereby moving adjacent ends of the intermediate bracket 5 and the tail bracket 6 from a position away from each other to a position close to each other, so as to securely hold the mast 3 at the center.

Figure 7A:
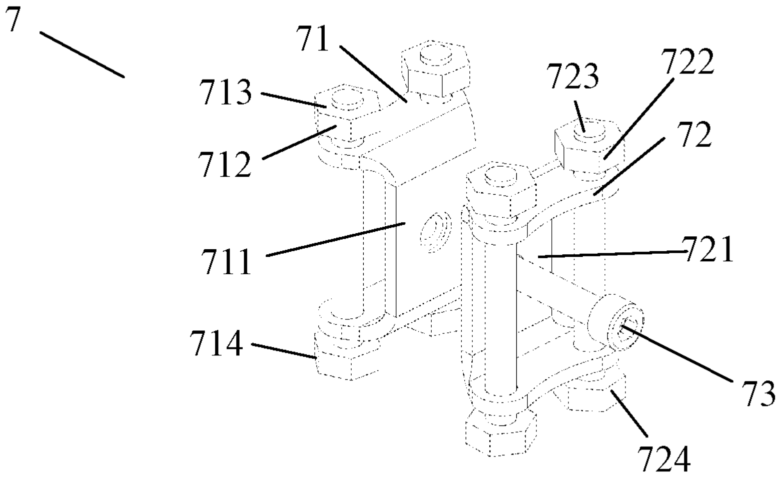
FIGS. 7A and 7B are perspective views of a bracket fastening mechanism of an antenna mounting device according to an embodiment of the present invention.
Figure 7B:
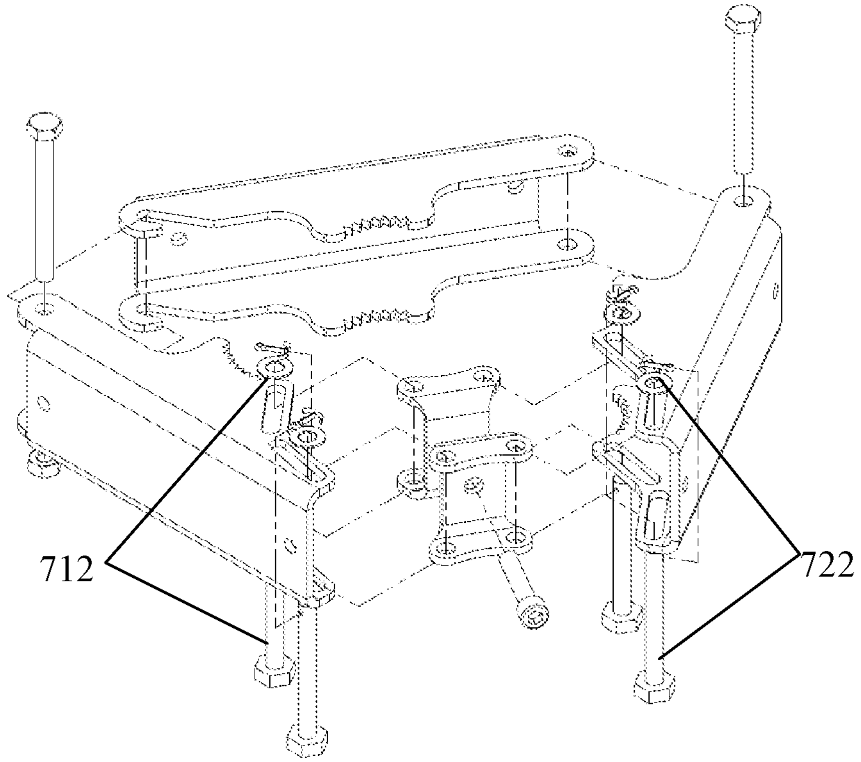

In one embodiment, as shown in FIGS. 3A and 3B, and FIGS. 5 and 6, the slot 525 of the intermediate bracket 5 is V-shaped, and includes two sub-slots 526 and 527 that are symmetrical and angled relative to each other. The included angle between the sub-slots 526 and 527 are between about 80 to 160 degrees, specifically between 120 to 150 degrees, more specifically between 130 to 140 degree. Correspondingly, the slot 625 of the tail bracket 6 is V-shaped, and includes two sub-slots 626 and 627 which are symmetrical and angled relative to each other. The included angle between the sub-slots 626 and 627 are between about 80 to 160 degrees, specifically between 120 to 150 degrees, more specifically between 130 to 140 degree. The slot 525 and the slot 625 are in mirror symmetry, and the V-shaped openings thereof face each other. The sub-slots 526, 527, 626, 627 may have a rectilinear shape, an inwardly concave arc shape, an outwardly convex arc shape or any other suitable curved shape. As shown in FIG. 7, the fastening plate 71 includes a plate body 711 and a pair of sliding members 712 projecting outward from the plate body 711. The sliding members 712 are confined within the sub-slot 526 of the intermediate bracket 5 and the sub-slot 626 of the tail bracket 6, and are slidable within the sub-slots 526 and 626. In one embodiment, each of the sliding members 712 includes an upper protruding portion 713 that projects vertically upward from one end of the upper portion of the plate body 711, and a lower protruding portion 714 that projects vertically downward from one end of the lower portion of the plate body 711. The two upper protruding portions 713 and the two lower protruding portions 714 of the fastening plate 71 are confined within the sub-slot 526 of the intermediate bracket 5 and the sub-slot 626 of the tail bracket 6 by enlarged heads at the top thereof, and are slidable within the sub-slots 526 and 626. Correspondingly, the fastening plate 72 includes a plate body 721 and a pair of sliding members 722 projecting outward from the plate body 721. The sliding members 722 are confined within the sub-slot 527 of the intermediate bracket 5 and the sub-slot 627 of the tail bracket 6, and are slidable within the sub-slots 527 and 627. In one embodiment, each of the sliding members 722 includes an upper protruding portion 723 that projects vertically upward from one end of the upper portion of the plate body 721, and a lower protruding portion 724 that projects vertically downward from one end of the lower portion of the plate body 721. The two upper protruding portions 723 and the two lower protruding portions 724 of the fastening plate 72 are confined within the sub-slot 527 of the intermediate bracket 5 and the sub-slot 627 of the tail bracket 6 by enlarged heads at the top thereof, and are slidable within the sub-slots 527 and 627. In one embodiment, the sliding members 712 and 722 may be constructed of bolts (as shown in FIG. 7A), or may be constructed of split pins mounted with a gasket at a top end (as shown in FIG. 7B), As shown in FIG. 3A, the bolt 73 is screwed, and the fastening plates 71 and 72 move towards each other by sliding the upper and lower protruding portions 713 and 714 of the fastening plate 71 within the sub-slots 526 and 626, and sliding the upper and lower protrusions 723 and 724 of the fastening plate 72 within the sub-slots 527 and 627, thereby moving adjacent ends of the intermediate bracket 5 and the tail bracket 6 from a position away from each other to a position close to each other, so as to securely hold the mast 3 at the center. In another embodiment, the slot 525 and the slot 625 are in mirror symmetry, and the V-shaped openings thereof face away from each other. At this time, the structures of the fastening plates 71 and 72 remain unchanged.

Figure 8A:
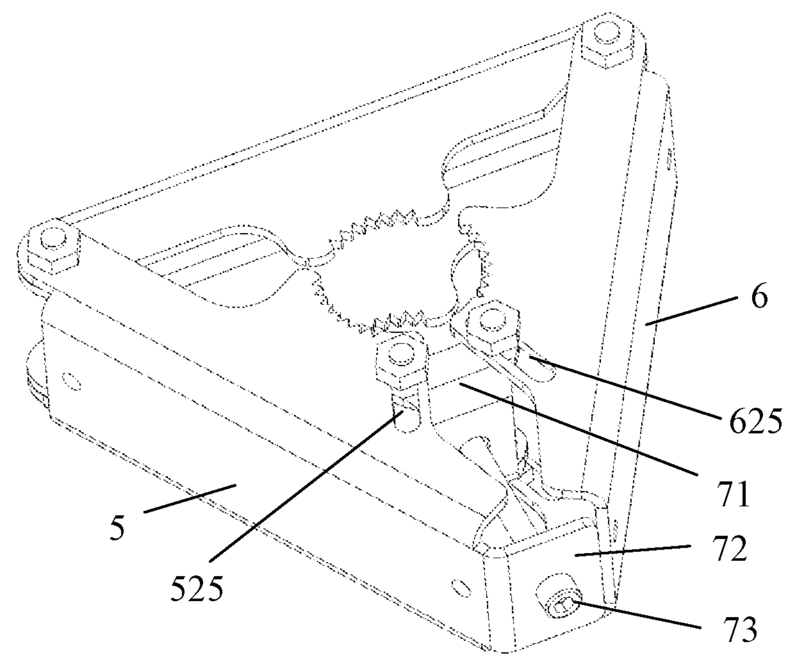
FIGS. 8A and 8B are an assembled perspective view and an exploded perspective view of an antenna mounting device according to another embodiment of the present invention.
Figure 8B:
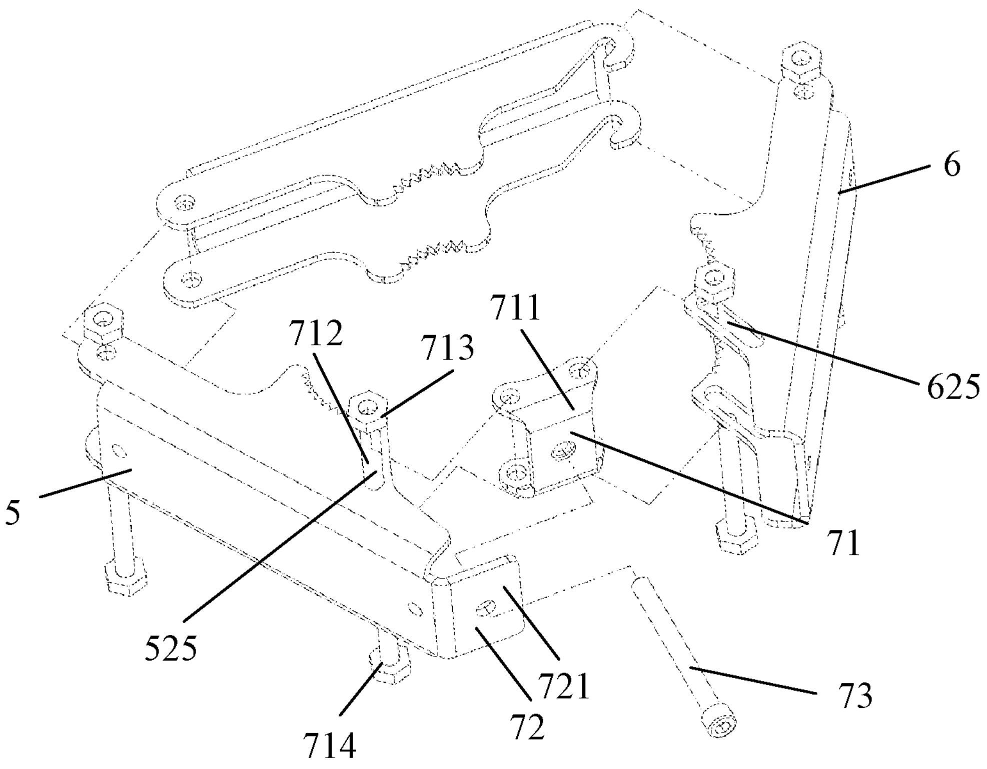

In another embodiment, as shown in FIGS. 8A and 8B, the slot 525 of the intermediate bracket 5 is straight; correspondingly, the slot 625 of the tail bracket 6 is straight. The slot 525 and the slot 625 are in mirror symmetry, and angled relative to each other. The included angle between the slots 525 and 625 are between about 20 to 100 degrees, specifically between 30 to 60 degrees, more specifically between 40 to 50 degree. The slots 525 and 625 may have a rectilinear shape, an inwardly concave arc shape, an outwardly convex arc shape or any other suitable curved shape. The fastening plate 71 includes a plate body 711 and a pair of sliding members 712 projecting outward from the plate body 711. The sliding members 712 are confined within the slot 525 of the intermediate bracket 5 and the slot 625 of the tail bracket 6, and are slidable within the slots 525 and 625. In one embodiment, each of the sliding members 712 includes an upper protruding portion 713 that projects vertically upward from one end of the upper portion of the plate body 711, and a lower protruding portion 714 that projects vertically downward from one end of the lower portion of the plate body 711. The two upper protruding portions 713 and the two lower protruding portions 714 of the fastening plate 71 are confined within the slot 525 of the intermediate bracket 5 and the slot 625 of the tail bracket 6 by enlarged heads at the top thereof, and are slidable within the slots 525 and 625. In one embodiment, the sliding member 712 may be constructed of a bolt, or may be constructed of split pins mounted with a gasket at a top end. The fastening plate 72 includes a plate body 721, and is fixedly connected to either of the intermediate bracket 5 and the tail bracket 6. The bolt 73 is screwed, and the fastening plate 71 moves towards the fastening plate 72 by sliding the upper and lower protruding portions 713 and 714 of the fastening plate 71 within the slots 525 and 625, thereby moving the intermediate bracket 5 and the tail bracket 6 towards each other from a position away from each other to a position close to each other, so as to securely hold the mast 3 at the center.

In the above embodiments, the slots are disposed on the intermediate bracket 5 and the tail bracket 6, and the bracket fastening mechanism 7 is disposed between the intermediate bracket 5 and the tail bracket 6. In other embodiments, the slots may also be disposed on the head bracket 4 and the intermediate bracket 5, and the bracket fastening mechanism 7 is disposed between the head bracket 4 and the intermediate bracket 5.

Figure 9A:
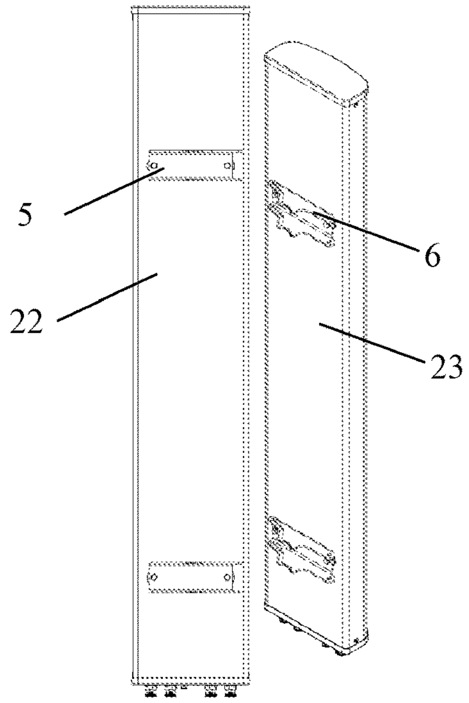
FIGS. 9A-9E illustrate and assembly process of an antenna mounting device and a base station antenna according to an embodiment of the present invention.
Figure 9B:
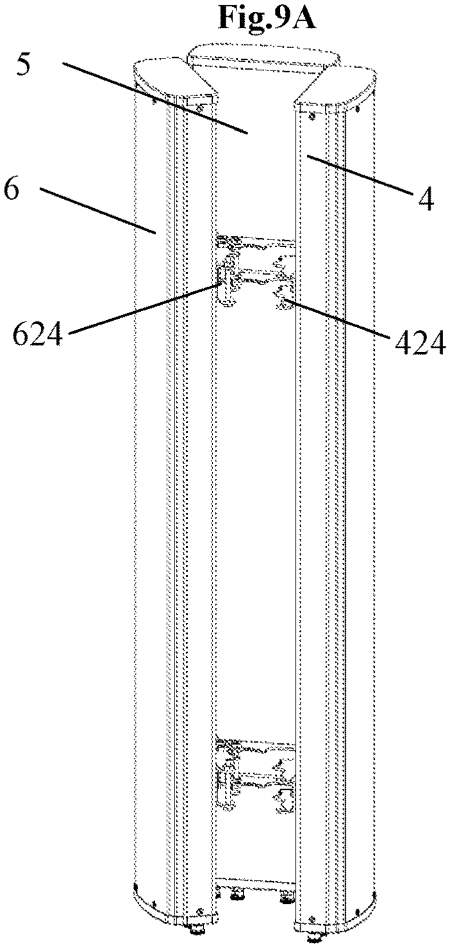
Figure 9C:
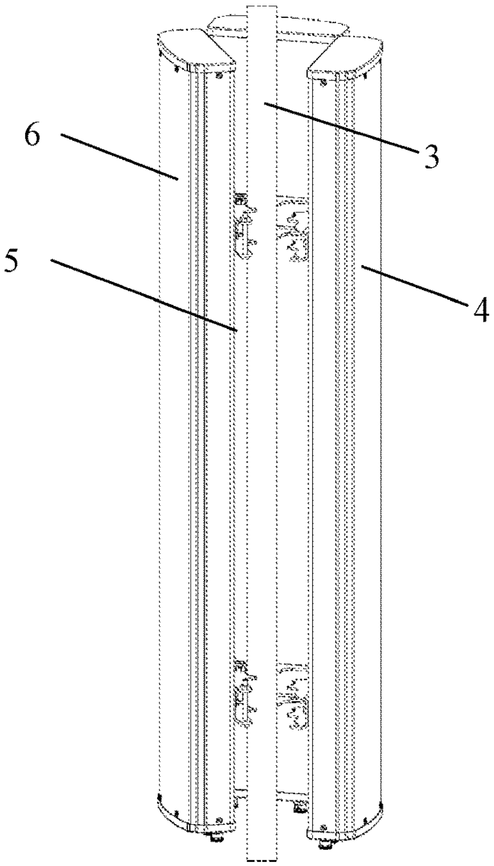
Figure 9D:
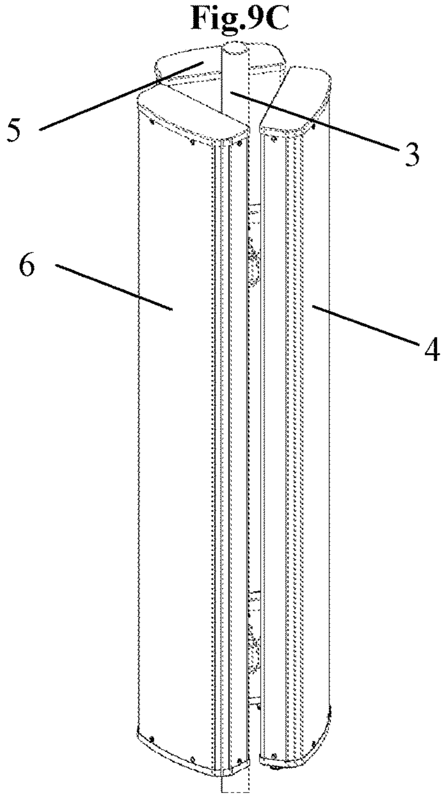
Figure 9E:
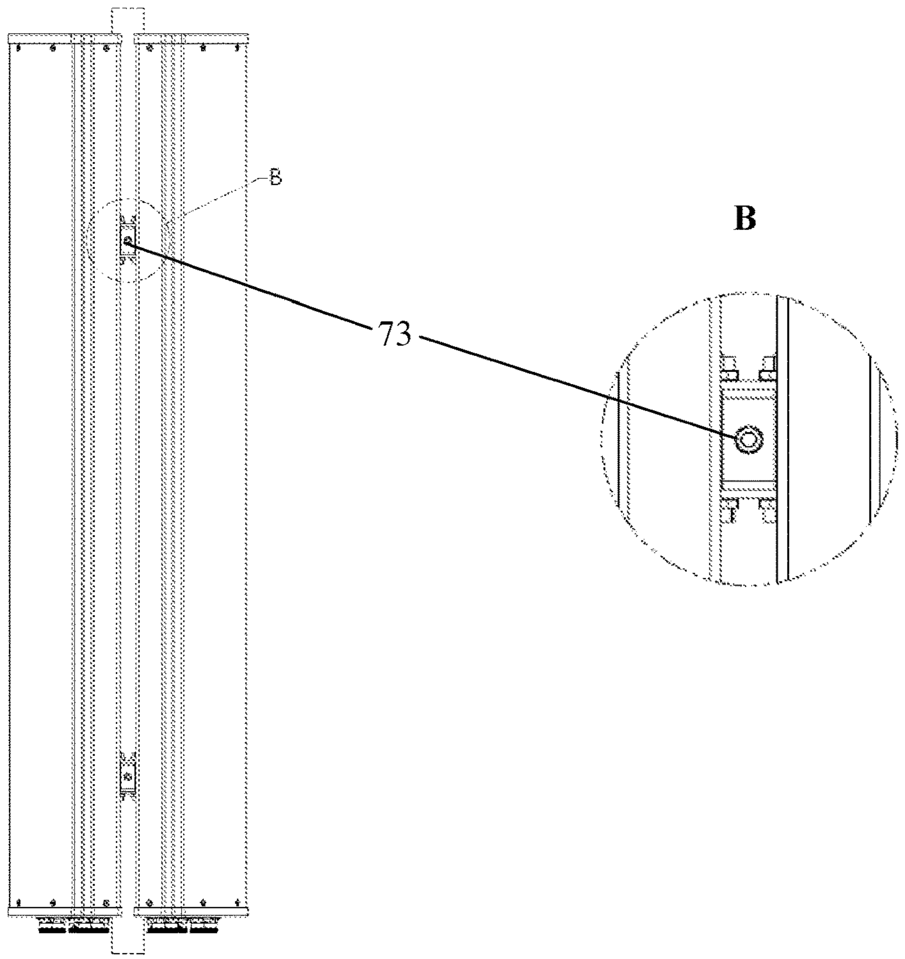

The process of mounting the base station antenna to the mast 3 using the antenna mounting device 1 will be introduced below with reference to FIGS. 9A-9E. First, as shown in FIG. 9A, three base station antennas 21, 22 and 23 are respectively connected to the head bracket 4, the intermediate bracket 5 and the tail bracket 6 by screws. Then, as shown in FIG. 9B, the head bracket 4 and the intermediate bracket 5 of the antenna mounting device 1 are connected together by a pin 426 through the pin holes 425 and 524. The intermediate bracket 5 and the tail bracket 6 are connected together by the bracket fastening mechanism 7 and located at a position away from each other, while the head bracket 4 and the tail bracket 6 are not connected together by the hook portion 424 and the rod portion 624, thereby leaving an opening for entry of the mast 3. Thereafter, as shown in FIG. 9C, the antenna mounting device 1 is placed into the enclosure of the mast 3 through the opening between the head bracket 4 and the tail bracket 6, and the mast fitting portion 421 of the head bracket 4, the mast fitting portion 521 of the intermediate bracket 5 and the mast fitting portion 621 of the tail bracket 6 are fitted to the outer contour of the mast 3. Thereafter, as shown in FIG. 9D, the head bracket 4 and the tail bracket 6 are connected together by the hook portion 424 and the rod portion 624, so that the head bracket 4, the intermediate bracket 5, and the tail bracket 6 form a closed triangular shape. Finally, as shown in FIG. 9E, the bolt 73 of the bracket fastening mechanism 7 is screwed by a screwing tool, to move adjacent ends of the intermediate bracket 5 and the tail bracket 6 from a position away from each other to a position close to each other, so as to securely hold the mast 3 at the center. Thereby, the mounting of the base station antenna to the mast 3 is finished using the antenna mounting device 1.

An antenna mounting device 1001 according to a second embodiment of the present disclosure will be described below with reference to FIG. 10. The antenna mounting device 1001 will add 1000 in the reference sign of the antenna mounting device 1 to present the same or similar structure.

Figure 10:
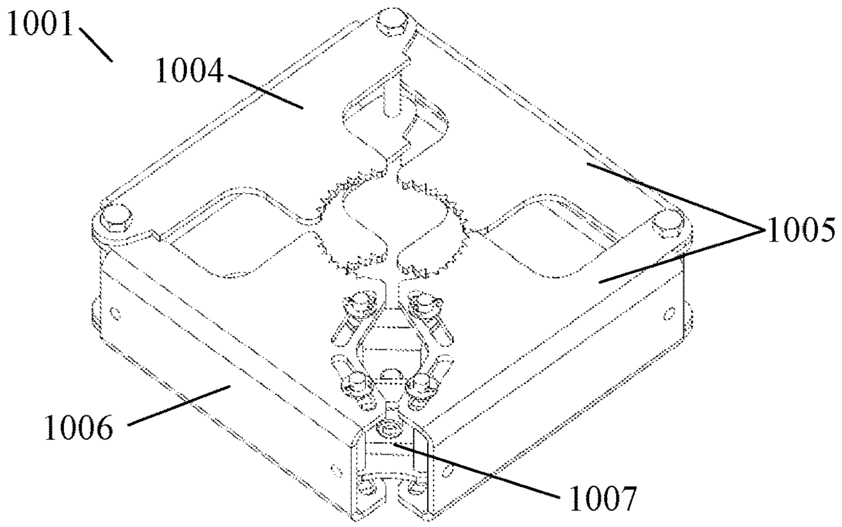
FIG. 10 is an assembled perspective view of an antenna mounting device according to a further embodiment of the present invention.

As shown in FIG. 10, the antenna mounting device 1001 has a substantially equilateral polygonal configuration having n sides (n>3), and the mast is disposed at the center of the polygon. The antenna mounting device 1001 comprises one head bracket 1004, (n−2) intermediate brackets 1005, and one tail bracket 1006 which are sequentially located on n side sides of the polygon. The head bracket 1004, the intermediate bracket 1005 and the tail bracket 1006 are elongated, and connected together by ends in a head-to-tail manner. The head bracket 1004, the intermediate bracket 1005 and the tail bracket 1006 are used to connect n base station antennas to the mast 3, respectively. The head bracket 1004, the intermediate brackets 1005, the tail bracket 1006, and the bracket fastening mechanism 1007 have substantially the same structure as the head bracket 4, the intermediate bracket 5, the tail bracket 6, and the bracket fastening mechanism 7, respectively.

The bracket fastening mechanism 1007 may be disposed between two adjacent ends of the head bracket 1004 and an adjacent intermediate bracket 1005, or disposed between two adjacent ends of the adjacent intermediate bracket 1005, or disposed between two adjacent ends of the tail bracket 1006 and the adjacent intermediate bracket 1005. Viewed in a clockwise or counterclockwise direction, in addition to the two ends provided with the bracket fastening mechanism described above, the first bracket 1004, the intermediate bracket 1005 and the tail bracket 1006 are pivotally connected together by ends in a head-to-tail manner. In one embodiment, in addition to the two ends provided with the bracket fastening mechanism described above, the two adjacent ends of the first bracket 1004 and the adjacent intermediate bracket 1005 are connected together by pins passing through the pin holes, the two adjacent ends of the adjacent intermediate bracket 1005 are connected together by pins passing through the pin holes, the two adjacent ends of the tail bracket 1006 and the adjacent intermediate bracket 1005 are connected together by pins passing through the pin holes, and the two adjacent ends of the tail bracket 1006 and the head bracket 1004 are connected together by fitting the hook with the rod portion, or fitting the pin with the pin hole.

The antenna mounting device according to the present invention is capable of mounting a plurality of base station antennas on a mast by surrounding the mast in a compact manner, thereby realizing a small-form factor mounting structure.

Although the exemplary embodiments of the present disclosure have been described, a person skilled in the art should understand that, he or she can make multiple changes and modifications to the exemplary embodiments of the present disclosure without substantively departing from the spirit and scope of the present disclosure. Accordingly, all the changes and modifications are encompassed within the protection scope of the present disclosure as defined by the claims. The present disclosure is defined by the appended claims, and the equivalents of these claims are also contained therein.

What is claimed is:

1. An antenna mounting device configured to collectively mount a plurality of base station antennas on a mast of a communication tower, wherein the antenna mounting device is substantially in the shape of a polygon, and the mast is disposed at a center of the polygon, the antenna mounting device comprising:

- a plurality of brackets, which are elongated and include a head bracket, at least one intermediate bracket and a tail bracket attached sequentially, wherein adjacent ends of the plurality of brackets are pivotally connected together in a head-to-tail manner, each bracket including an antenna connection portion and a mast connection portion connected to each other, wherein the antenna connection portion faces away from the mast and is configured to connect the base station antenna to the bracket, and the mast connection portion faces the mast and is configured to connect the bracket to the mast; and
- a bracket fastening mechanism which is disposed between two adjacent ends of the head bracket and an adjacent intermediate bracket, or disposed between two adjacent ends of the adjacent intermediate brackets, or disposed between two adjacent ends of the tail bracket and the adjacent intermediate bracket, and which is configured to move two adjacent ends of the adjacent brackets via a fastening rod from a position away from each other to a position close to each other.

2. The antenna mounting device according to claim 1, wherein the bracket fastening mechanism includes a first fastening plate and a second fastening plate in parallel relationship, and the fastening rod is threadedly connected to the first fastening plate and the second fastening plate.

3. The antenna mounting device according to claim 2, wherein the two adjacent ends of said adjacent brackets are provided with a pair of slots in mirror symmetry, wherein the first fastening plate and the second fastening plate are movable towards each other or movable away from each other along the pair of slots upon rotation of the fastening rod.

4. The antenna mounting device according to claim 3, wherein each of the slots is V-shaped, and includes a first sub-slot and a second sub-slot symmetrical and inclined to each other.

5. The antenna mounting device according to claim 4, wherein the first fastening plate and the second fastening plate each include a plate body and a pair of sliding members disposed on the plate body.

6. The antenna mounting device according to claim 5, wherein the sliding member is configured as protruding portions projecting outward from the plate body and having a head with an increased size.

7. The antenna mounting device according to claim 4, wherein V-shaped openings face each other or face away from each other.

8. The antenna mounting device according to claim 4, wherein each of the sub-slots has a rectilinear shape, an inwardly concave arc shape, or an outwardly convex arc shape.

9. The antenna mounting device according to claim 3, wherein the pair of slots each have a straight linear shape, and are inclined to each other.

10. The antenna mounting device according to claim 1, wherein the antenna connection portion is configured as a side wall, and the mast connection portion is configured as at least one protruding wall that projects outward from the side wall in the same direction and is parallel to each other.

11. The antenna mounting device according to claim 10, wherein the at least one protruding wall includes two protruding walls.

12. The antenna mounting device according to claim 10, wherein the side wall is connected to the base station antenna in a mechanical connection manner.

13. The antenna mounting device according to claim 10, wherein the side wall is connected to the base station antenna by screws or bolts.

14. The antenna mounting device according to claim 10, wherein the protruding wall includes a mast fitting portion which has an outer contour matching that of the mast so as to assemble the bracket to the mast.

15. The antenna mounting device according to claim 1, wherein in addition to two adjacent ends provided with the bracket fastening mechanism, two adjacent ends of the head bracket and the adjacent intermediate bracket, two adjacent ends of the adjacent intermediate brackets, and two adjacent ends of the tail bracket and the adjacent intermediate bracket are pivotally connected together by a pin.

16. The antenna mounting device according to claim 1, wherein one of two adjacent ends between the head bracket and the tail bracket is provided with a hook portion, and the other is provided with a rod portion for hooking the hook portion.

17. The antenna mounting device according to claim 1, wherein the two adjacent ends between the head bracket and the tail bracket are pivotally connected together by a pin.

18. An antenna mounting device configured to collectively mount a plurality of base station antennas on a mast of a communication tower, comprising:

first, second and third elongated brackets, wherein adjacent ends of the plurality of brackets are pivotally connected together in a head-to-tail manner, each of the first, second and third brackets including an antenna connection portion and a mast connection portion connected to each other, wherein the antenna connection portion faces away from the mast and is configured to connect the base station antenna to the bracket, and the mast connection portion faces the mast and is configured to connect the bracket to the mast; and a bracket fastening mechanism which is disposed between two adjacent ends of two of the first, second and third brackets, the bracket fastening mechanism configured to move the two adjacent ends via a fastening rod between spaced apart and closely adjacent positions, wherein in the spaced apart position, the brackets are free to slide relative to the mast, and in the closely adjacent position, the brackets clamp onto the mast to prevent relative sliding of the brackets and mast.

19. The antenna mounting device defined in claim 18, wherein a first antenna is mounted to the first bracket.

20. The antenna mounting device defined in claim 19, wherein the first bracket is attached to the first antenna at a location spaced from an end of the first antenna.

21. An antenna mounting device configured to collectively mount a plurality of base station antennas on a mast of a communication tower, wherein the antenna mounting device is substantially in the shape of a polygon, and the mast is disposed at a center of the polygon, the antenna mounting device comprising:

a plurality of brackets, which are elongated and include a head bracket, at least one intermediate bracket and a tail bracket attached sequentially, wherein adjacent ends of the plurality of brackets are pivotally connected together in a head-to-tail manner, each bracket including an antenna connection portion and a mast connection portion connected to each other, wherein the antenna connection portion faces away from the mast and is configured to connect the base station antenna to the bracket, and the mast connection portion faces the mast and is configured to connect the bracket to the mast; and a bracket fastening mechanism which is disposed between two adjacent ends of the head bracket and an adjacent intermediate bracket, or disposed between two adjacent ends of the adjacent intermediate brackets, or disposed between two adjacent ends of the tail bracket and the adjacent intermediate bracket, and which is configured to move two adjacent ends of the adjacent brackets from a position away from each other to a position close to each other, wherein the antenna connection portion is configured as a side wall, and the mast connection portion is configured as at least one protruding wall that projects outward from the side wall in the same direction and is parallel to each other.

* * * * *